`US007767958B2`

United States Patent
Luling et al.

(10) Patent No.: US 7,767,958 B2
(45) Date of Patent: Aug. 3, 2010

(54) NANOGRASS GAMMA DETECTOR

(75) Inventors: Martin Luling, Paris (FR); Gilles Mathieu, Meudon (FR); Anthony Veneruso, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/043,300

(22) Filed: Mar. 6, 2008

(65) Prior Publication Data

US 2009/0014636 A1 Jan. 15, 2009

(30) Foreign Application Priority Data

Mar. 9, 2007 (EP) .................................. 07103888

(51) Int. Cl.
*G01V 5/04* (2006.01)
*G01V 5/12* (2006.01)

(52) U.S. Cl. ..................... 250/256; 250/269.3; 977/742

(58) Field of Classification Search ................. 250/256, 250/265, 266, 269.2, 385.1, 338.1, 269.3; 977/742

See application file for complete search history.

(56) References Cited

U.S. PATENT DOCUMENTS

| | | | |
|---|---|---|---|
| 3,652,852 A | | 3/1972 | Miyazawa et al. |
| 5,528,556 A | * | 6/1996 | Seeman et al. ................. 367/25 |
| 5,665,971 A | * | 9/1997 | Chen et al. ................. 250/385.1 |
| 6,400,088 B1 | | 6/2002 | Livingston et al. |
| 6,467,781 B1 | | 10/2002 | Feng |
| 6,667,572 B2 | * | 12/2003 | Lewis ........................... 313/524 |
| 6,765,190 B2 | * | 7/2004 | Jordan ....................... 250/214.1 |
| 7,456,383 B2 | * | 11/2008 | Kim et al. .................... 250/226 |
| 2003/0025084 A1 | | 2/2003 | Honda et al. |
| 2003/0143398 A1 | * | 7/2003 | Ohki et al. ................... 428/398 |

OTHER PUBLICATIONS

Kotani et al., Development of a New Radiation Detector Utilizing CNTs as Anodes, Physica E—Low Dimensional Systems and Nanostructures, Elsevier Science BV. NL, vol. 29, No. 3-4, Nov. 2005. pp. 505-509.

* cited by examiner

*Primary Examiner*—David P Porta
*Assistant Examiner*—Faye Boosalis
(74) *Attorney, Agent, or Firm*—Myron K. Stout

(57) ABSTRACT

A gamma-ray detector comprising:
  a housing having a window through which gamma rays can enter; the housing comprising;
  a two-dimensional array of electrically conducting carbon nanotubes, which act as a cathode, on a substrate;
  a metal plate electrode, which acts as an anode, positioned opposite the substrate so that there is a gap containing a gas between the electrode and the nanotubes; and
  a voltage source connected to the substrate and the electrode such that when in use the voltage between the substrate and the electrode is maintained below the arc-threshold voltage so that no electric current can flow through the gap between the nanotubes and the electrode;
wherein the electrode and the substrate are arranged such that when a gamma ray enters the housing and hits one of the nanotubes a spark discharge is triggered between the nanotubes and the plate electrode creating an electrical current that can be measured.

11 Claims, 4 Drawing Sheets

NANOGRASS GAMMA DETECTOR

TECHNICAL FIELD

This invention relates to the use of nanotubes in a gamma ray detector, in particular a gamma ray detector as an imaging device for use in an oil or gas well or the like.

BACKGROUND ART

Gamma-ray measurements serve to detect radioactivity, whether it is from natural background radiation or from artificially created and deployed sources. They are used in many industries, such as non-destructive testing and inspection of materials and equipment, medicine, geologic (i.e., mineral) exploration, as well as in oil and gas exploration.

In oil and gas exploration, gamma-ray measurements can be used to determine the properties of formations surrounding wells. Gamma ray tools are used to measure density, porosity, photoelectric factor (Pe), hydrogen index, salinity and thermal neutron capture cross section (sigma).

Gamma ray detectors generally comprise a scintillation detector, composed of a scintillation crystal, e.g. NaI, BGO, CsI, GSO or LSO, coupled to a photomultiplier tube, see for example U.S. Pat. No. 6,467,781.

U.S. Pat. No. 6,400,088 describes an infrared photon detector that comprises an array of nanotubes that absorbs infrared photons and creates photoelectrons. Infrared photons constitute electromagnetic radiation, as do gamma rays; however, infrared photons contain an energy that is several orders of magnitude lower than the typical gamma-ray spectrum.

US20030025084 describes a radiation detector containing carbon nanotubes. The nanotubes are mounted on a scintillator and used to convert the emitted light to electrical energy. The visible light from the scintillation screen is only one order of magnitude (a factor ten) more energetic than the infrared radiation; it is still several orders of magnitude lower than the gamma-ray spectrum.

As the diameter and length of nanotubes are in the order of a few nanometers to several nanometers, their use in gamma ray detectors allows for the development of smaller devices. Nanotube based detectors also have an advantage over crystal based scintillation detectors in their ability to withstand high temperatures and maintain stability in such conditions. Therefore the object of the invention is to develop smaller gamma ray detectors that can be used downhole in oil or gas wells.

DISCLOSURE OF THE INVENTION

Accordingly a first embodiment of the invention is a gamma-ray detector comprising: a housing having a window through which gamma rays can enter; the housing comprising; a two-dimensional array of electrically conducting carbon nanotubes, which act as a cathode, on a substrate; a metal plate electrode, which acts as an anode, positioned opposite the substrate so that there is a gap containing a gas between the electrode and the nanotubes; and a voltage source connected to the substrate and the electrode such that when in use the voltage between the substrate and the electrode is maintained below the arc-threshold voltage so that no electric current can flow through the gap between the nanotubes and the electrode; wherein the electrode and substrate are arranged such that when a gamma ray enters the housing and hits one of the nanotubes a spark discharge is triggered between the nanotubes and the plate electrode creating an electrical current that can be measured.

Preferably the substrate and the electrode are each divided into subsections, so that electrical current of each subsection can be measure independently. The subsections can be in the form of strips. Preferably the strips are arranged so that the substrate strips are orthogonal to the electrode strips. Each of the subsections has a homogenous array of carbon nanotubes (called nanograss). Having the nanotubes divided into subsections allows for spatial discrimination of the gamma-quanta impact in two dimensions to be obtained.

The gamma-ray detector can comprise an ammeter for measuring the electric current.

Preferably the gas comprises a mixture of about 75% to 90% noble gas and about 10% to 25% hydrocarbon gas. The gas will support the spark discharge.

In a second embodiment of the invention an imaging device comprises the gamma-ray detector described above. Examples of imaging devices include medical imaging devices, fluid flow imaging devices, and devices for the non-destructive imaging of materials.

In a further embodiment of the invention a downhole measurement device for use in detecting gamma rays down a well comprises the detector as described above. The measurement device can be integrated into a downhole image logging device for use in forming images of the downhole environment.

Another embodiment of the invention comprises a method for detecting gamma rays in a well comprising: inserting the detector as described above, down a borehole; applying a voltage to the substrate and the electrode; and detecting a current created when a gamma ray hits a nanotube. By monitoring for a change in current, you are able to detect the presence of gamma rays in the well.

A further embodiment of the invention comprises a method for imaging an object comprising inserting the detector, as described above, about an object; applying a voltage to the substrate and the electrode; detecting a current created when a gamma ray hits a nanotube; using the current created to determine the position of the gamma ray impact; and using the position of successive gamma ray impacts to form an image log. The method can be used for fluid flow imaging, medical imaging or non-destructive imaging of materials.

A further embodiment of the invention comprises a method for image logging in a well comprising inserting the detector as described above down a borehole; applying a voltage to the substrate and the electrode; detecting a current created when a gamma ray hits a nanotube; using the current created to determine the position of the gamma ray impact; and using the position of successive gamma ray impacts to form an image log.

To obtain an image, i.e., to spatially discriminate the gamma-ray distribution, the substrate and the electrode can each be divided into subsections, so that the electrical current of each subsection can be measured independently, and therefore allow for spatial discrimination of the gamma-quanta impact in two dimensions to be obtained.

MODE(S) FOR CARRYING OUT THE INVENTION

Figure 1:
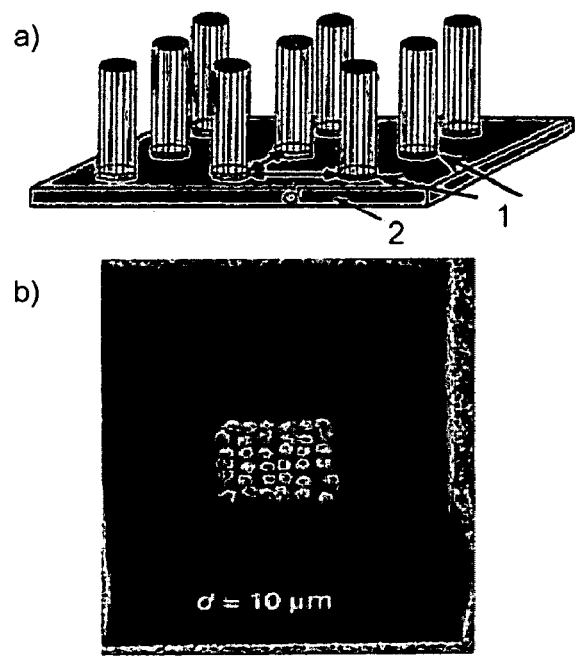
FIG. 1 (a) shows a schematic diagram of a nanograss patch and (b) a SEM photo of a nanotube arrangement.

Carbon nanotubes are tubes in which the walls are formed of a regular hexagonal mesh of carbon atoms. These nanotubes typically have a diameter of a few nanometers ($10^{-9}$ m) and a length of several hundred nanometers ($10^{-7}$ m) to a few microns ($10^{-6}$ m). One type of process for synthesising carbon nanotubes is chemical vapour deposition (CVD) of hydrocarbons. With reference to FIG. 1(a) one process for preparing carbon nanotubes comprises patterning areas of silica ($SiO_2$) 1, on a silicon semiconductor wafer called the substrate 2. Carbon nanotubes can then be grown on the silica areas in a CVD or a plasma enhanced CVD (PECVD) process. When the nanotubes are deposited on a flat substrate as a dense, fairly evenly spaced pattern of parallel tubes, oriented orthogonal to the substrate, the arrangement of the tubes under a scanning electron microscope SEM (FIG. 1(b)) is considered to resemble a lawn a fine grass. Hence this type of deposition is often referred to as nanograss.

Figure 2:
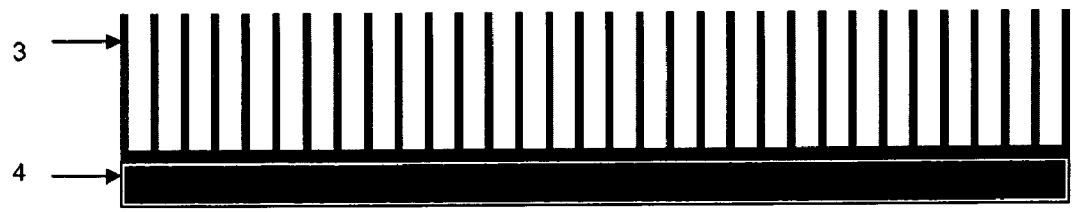
FIG. 2 is a schematic of a nanograss patch.

For use in a gamma ray detector, a moderately sized patch of nanograss comprising a plurality of evenly spaced nanotubes 3 on a substrate 4 is used, FIG. 2. The patch may be rectangular with the length of the edges of the patch ranging from about several to tens of millimeters. The size of the patch is determined by the production process and the application; there is no fundamental limitation to the patch size.

Figure 3:
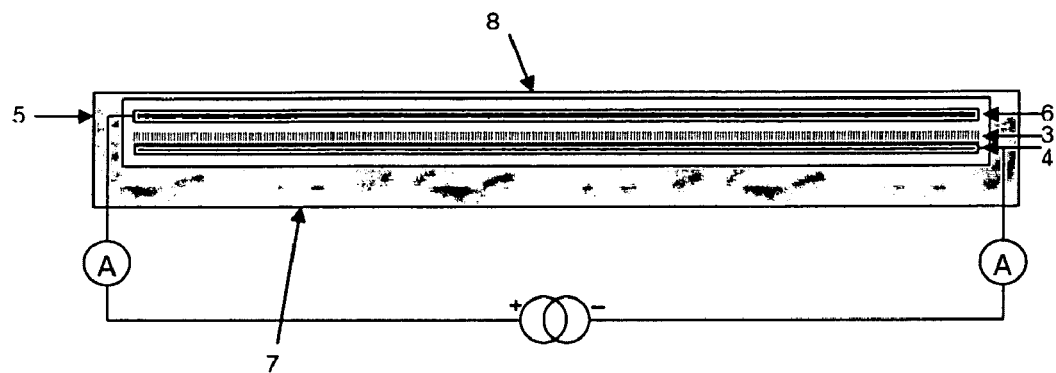
FIG. 3 is a side view of a basic gamma ray detector.
Figure 4:
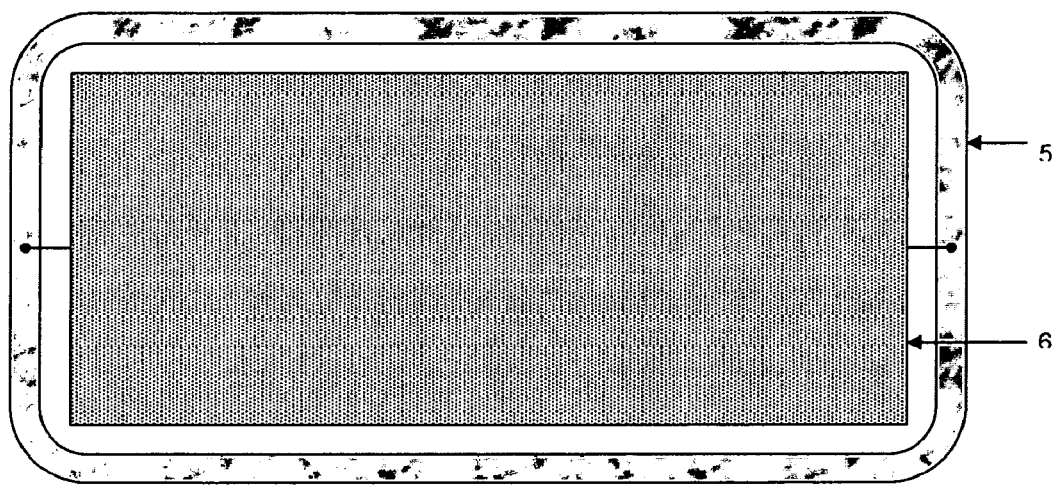
FIG. 4 is a top view of a basic gamma ray detector.

With reference to FIG. 3 and FIG. 4 one embodiment of the invention is a gamma ray detector having a nanograss patch, comprising a plurality of nanotubes 3 which acts as a cathode deposited on a substrate 4, in a housing 5. This patch may have a surface area of a few $cm^2$. Placed opposite the substrate at a distance of typically a few hundred microns ($10^{-4}$ m) to a few millimeter ($10^{-3}$ m), is a grounded metal-plate electrode 6 which acts as an anode. The nanograss substrate is placed on insulating high-density housing 7, which acts as shielding against unwanted gamma rays from below, while the metal plate electrode is under an insulating, low density window 8. The low density window allows gamma rays to enter the housing. The ground plate anode-electrode 6 has at least the same area as the substrate 4 such that the nanotubes 3 are positioned under the electrode plate. The nanograss patch is set at a negative electric potential relative to the plate, so that a slight excess of electrons is fed into the patch. The nanotubes are electrically conducting with the end of each nanotube constituting a point of high electric fields with a large electric field gradient. The excess electrons from the cathode power supply will accumulate at these tips. The space between the nanotubes 3 and the ground plate electrode 6 is filled with a dilute gas having suitable electric-insulation properties. The gas filling the space between the electrode and the nanograss will have suitable electrical insulation and breakdown properties, so that a spark discharge can form when a gamma-ray hits the nanotubes. A commonly used gas in proportional-counter chambers for particle detection comprises a mixture of 75-90% noble gas, such as Ar or Xe, with the remainder being a light hydrocarbon gas, preferably methane ($CH_4$).

Figure 5:
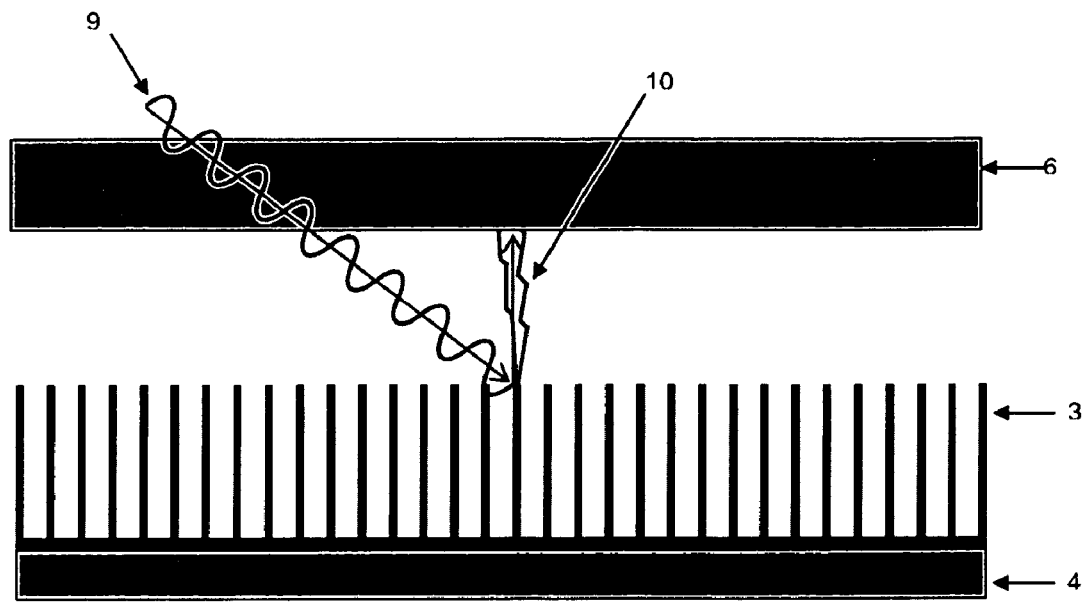
FIG. 5 is schematic of the operation of a basic gamma ray detector.

The voltage between the nanograss cathode and metal-plate anode is set slightly below the electric breakdown threshold. In this situation no electric current can flow across the chamber. As shown in FIG. 5 when a gamma ray quantum 9 enters the chamber through the window it can pass through the metal plate electrode 6 and can cross the space between the electrode 6 and nanotubes 3 substantially unimpeded. The gamma ray will hit onto or very close to the tip of one of the nanotubes 3. As the gamma-ray is an electromagnetic signal it will temporarily drive the electric field beyond the breakthrough voltage and thus trigger a spark discharge 10 between the nanograss cathode and the metal-plate anode. The discharge is measured by an ammeter located in either of the electric wire leads from the cathode or anode. By monitoring the ammeter for a change in electric current it is possible to detect the presence of the gamma ray quantum.

The spark discharged is formed by the gamma ray quantum being absorbed by at least one electron that will trigger a spark avalanche. The quantum energy is transferred to the electron as kinetic energy. This kinetic energy then may be converted to freeing secondary electrons, so that the signal amplitude of the spark discharge is a monotonic, preferably linear function of the gamma ray energy. The gas present in the housing will have properties that support a spark discharge with a current that grows approximately linearly with the triggering gamma quantum energy. A gas commonly used in proportional counter chambers for particle detection comprises a mixture of 75-90% of a noble gas, such as Ar or Xe, with the remainder being a light hydrocarbon gas, preferably methane ($CH_4$).

Having a single metal plate electrode and a single nanograss patch cathode is sufficient for detecting low intensity radiation. However when there is higher gamma ray intensity a second gamma quantum can hit the nanograss cathode while the spark discharge from the first gamma quantum has not yet died off. A "pile up" will occur and will distort the gamma ray counts and their energy spectrum.

Figure 6:
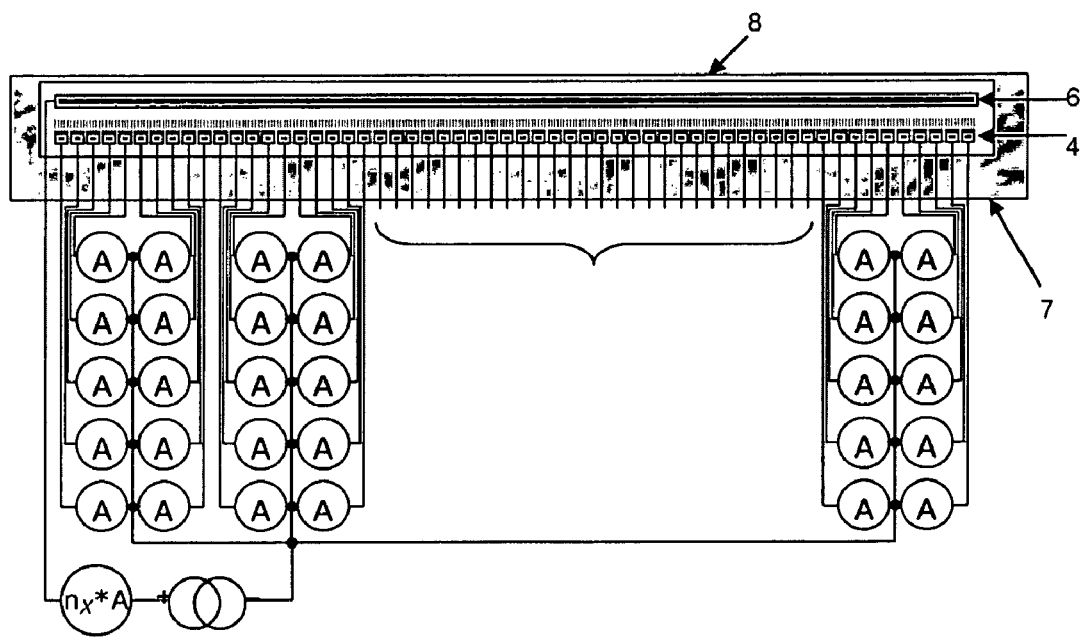
FIG. 6 is a side view of a gamma ray detector having a strip array arrangement.
Figure 7:
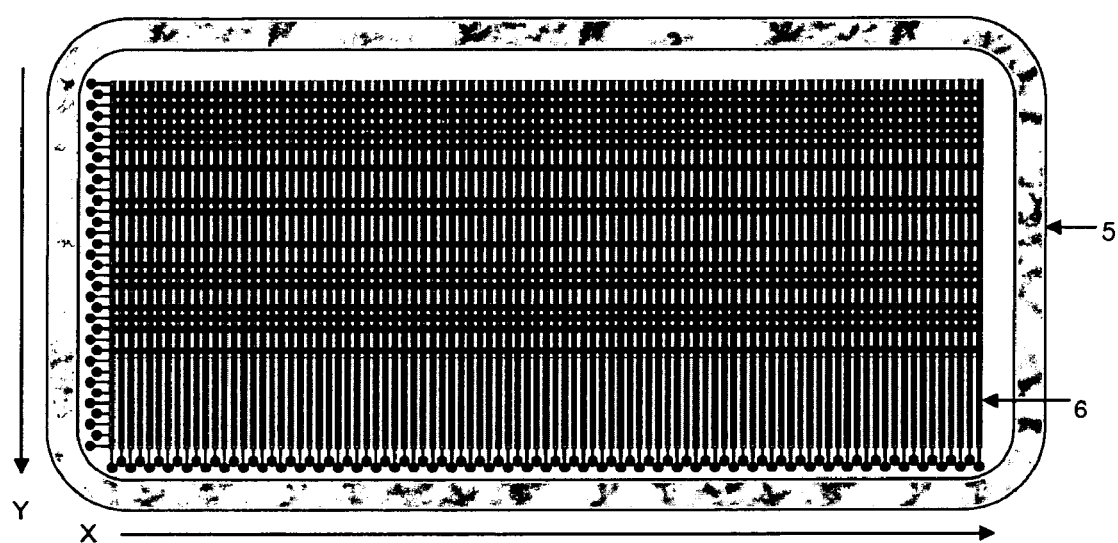
FIG. 7 is a top view of a gamma ray detector having a strip array arrangement.

With reference to FIGS. 6 and 7 an alternative form of the gamma ray detector of the invention comprises a detector where the nanograss cathode and the metal plate anode are divided into smaller patches to reduce the risk of a pile up occurring.

The nanograss substrate 4 is divided into narrow strips in one direction, the X-direction, while the opposite metal plate electrode 6 is divided into strips in the Y-direction. Typically, these strips may have a width of several hundred microns ($10^{-4}$ m) to a millimeter ($10^{-3}$ m). Their width shall be similar to the spacing between the nanograss cathode and the metal-plate anode. The substrate and the electrode therefore consist of an array of narrow strips where the substrate strips run orthogonal to the electrode strips. The nanograss strips are driven in parallel with the electric currents of each strip measured separately. The metal-electrode strips are kept at the same potential, with the electric currents of each strip monitored separately. The current between any single nanograss strip and any single electrode strip can be measured. Any single spark discharge will trigger an electric current between a unique X-direction nanograss strip and a unique Y-direction metal-anode strip. Using the position of successive gamma-rays impacts an image log can be formed. The segmented detector therefore provides a spatial discrimination and thus can be used as an imager device. The image resolution (pixel size) is determined by the width of the strips.

With this strip configuration if two gamma quanta hit simultaneously, the two spark discharges are triggered between different strip pairs. Most of the time, the gamma-ray quanta will hit different nanograss cathode strips with different metal-anode strips receiving the resultant spark discharges. This situation produces two distinct signals where the measured currents out of the nanograss strips are paired up with the measured currents from the metal-anode strips. The currents will slightly differ in intensity according to the gamma-quanta energy.

Occasionally, two gamma quanta may hit the same narrow nanograss strip, triggering two spark discharges. As long as they hit some distance apart, two different metal-anode strips will receive the sparks with their relative current strengths proportional to the gamma-quanta energy. In this situation, the total current from the nanograss strip must add up to the combined currents from the two metal-anode strips. Equivalently, two gamma quanta may hit different nanograss strips, but discharge into the same metal-anode strip. Again, the combined current from the nanograss strips will add up to the total current from the metal-anode strip. In this situation the capability of spatial discrimination, or imaging capability, is still preserved. Only the two-fold redundancy is lost.

Pile up cannot be avoided in the situation where two gamma quanta hits the same nanograss strip and discharges into the same metal-anode strip, and as such no longer permit gamma quanta discrimination. Such events cannot be completely eliminated; however, it is possible to reduce the likelihood of them occurring by refining the strip width for both the nanograss cathode and the metal-plate anode according to the expected or required gamma-ray flux density.

The detector can record naturally occurring gamma rays in the formation adjacent to the wellbore. The detected signal can then be transmitted uphole or temporarily stored downhole for latter processing to evaluate the geological formation from which the data was gathered.

The proposed, basic nanograss detector can be used as gamma ray detector for wireline or LWD logging or on a MWD tool, as well as a detector for density measurements. The size of the nanograss patch determines the detectors sensitivity to low gamma-quanta-flux densities. For low flux densities of gamma rays a larger nanograss patch may be necessary while high gamma-flux densities require a smaller patch that occupies less volume inside a tool.

The flat geometry of the nanograss detector allows itself to be deformed. A larger patch can be curved and thus be adapted to a wide range of tool surfaces. A bent patch can also be adapted to the inner or outer circumference of a borehole, casing, tubing or pipe where it can be used for fluid flow tomography in any measurement apparatus where a gamma ray emission or absorption is involved. Due to the small size of the nanograss gamma ray detector they can be used in small assemblies to replace existing detectors that are generally larger, bulkier and more expensive. The small size of the detector strips allows them to be included more easily in a device arranged with gamma ray shields that restrict the gamma ray detection to one edge of the device. For example in a device dedicated to inner flow metering, an outer shield could reduce the influx of natural gamma rays from the external environment.

The extension of the nanograss gamma-ray detector to a gamma-ray imager with its spatial discrimination capability will have applications in imaging logging. The gamma-ray imaging device may also be used in other industries beyond oil and gas exploration. Other applications for the gamma ray detector include the nondestructive testing and inspection of materials and equipment, fluid-flow monitoring, medical imaging and in geological exploration, such as for the detection of minerals.

In the medical imaging industry, for example for positron-emission tomography, a large finely segmented gamma-ray imager can be used where the substrate comprising the nanotubes can be divided into fine strips. A medical imaging device, such as a tomography device, comprises the gamma ray detector which can detect the gamma rays emitted by a radioactive isotope administered to a patient. Spatial information about the distribution of the gamma source can be determined by identifying the location of the gamma ray impact in the X- and Y-direction position through monitoring the nanograss strips that the gamma ray detector comprises.

In fluid flow monitoring, the gamma ray detector can be used to characterise fluid flow through materials. For example the detector can be used to help characterise fluid flows in wells. A fluid is injected with a radioactive tracer and the gamma ray detector monitors the tracer as it flows in the fluid past the detector positioned in the well. In measurement while drilling the gamma-ray detector can be used either downhole or at the surface to monitor the natural radioactivity of the circulated flux of mudding or cuttings, thereby providing a crude characterization of the type of rock being drilled.

Changes may be made while still remaining within the scope of the invention.

The invention claimed is:

1. A gamma-ray detector comprising:
   a housing having a window through which gamma rays can enter; the housing comprising;
   a two-dimensional array of electrically conducting carbon nanotubes, which act as a cathode, on a substrate;
   a metal plate electrode, which acts as an anode, positioned opposite the substrate so that there is a gap containing a gas between the electrode and the nanotubes; and
   a voltage source connected to the substrate and the electrode such that when in use the voltage between the substrate and the electrode is maintained below the arc-threshold voltage so that no electric current can flow through the gap between the nanotubes and the plate electrode;
   wherein the electrode and the substrate are arranged such that when a gamma ray enters the housing and hits one of the nanotubes a spark discharge is triggered between the nanotubes and the electrode creating an electrical current that can be measured and using the location of the current created to determine the position of the gamma ray impact.

2. A gamma-ray detector according to claim 1 wherein the substrate and the electrode are each divided into subsections, so that the electrical current of each subsection can be measured independently.

3. A gamma-ray detector according to claim 2 wherein the subsections are in the form of strips.

4. A gamma-ray detector according to claim 3 wherein the strips are arranged so that the substrate strips are orthogonal to the electrode strips.

5. A gamma-ray detector according to claim 1 comprising an ammeter for measuring the electric current.

6. An imaging device comprising the detector as claimed in claim 1.

7. A downhole gamma measuring device comprising the detector as claimed in claim 1.

8. A downhole image logging tool comprising the detector as claimed in claim 1.

9. A method for detecting gamma rays in a well comprising:
   inserting the detector according to claim 1, down a borehole;
   applying a voltage to the substrate and the electrode;
   detecting a current created when a gamma ray hits a nanotube; and
   using the location of the current created to determine the position of the gamma ray impact.

10. A method for imaging an object comprising:
    placing the detector according to claim 1 about the object to be imaged;
    applying a voltage to the substrate and to the electrodes;

detecting a current created when a gamma ray hits a nanotube;

using the location of the current created to determine the position of the gamma ray impact; and using the position of successive gamma ray impacts to form an image log.

11. A method for image logging in a well comprising:

inserting the detector according to claim 1 down a borehole;

applying a voltage to each of the substrates and the electrodes;

detecting a current created when a gamma ray hits a nanotube; and using the location of the current that is created to determine the position of the gamma ray impact; and using the position of successive gamma ray impacts to form an image log.

\* \* \* \* \*